United States Patent
Vreeland

(10) Patent No.: US 12,228,414 B2
(45) Date of Patent: Feb. 18, 2025

(54) EMISSION-OPTIMIZED VEHICLE ROUTE AND CHARGING

(71) Applicant: Rivian IP Holdings, LLC, Plymouth, MI (US)

(72) Inventor: William Vreeland, Palo Alto, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 58 days.

(21) Appl. No.: 17/530,067

(22) Filed: Nov. 18, 2021

(65) Prior Publication Data

US 2023/0152108 A1 May 18, 2023

(51) Int. Cl.
*G01C 21/34* (2006.01)
*G01C 21/36* (2006.01)

(52) U.S. Cl.
CPC ..... *G01C 21/3469* (2013.01); *G01C 21/3682* (2013.01)

(58) Field of Classification Search
CPC .................................................. G01C 21/3469
See application file for complete search history.

(56) References Cited

U.S. PATENT DOCUMENTS

| | | | |
|---|---|---|---|
| 2009/0082952 A1* | 3/2009 | Narita | G01C 21/3469 701/533 |
| 2011/0191015 A1* | 8/2011 | Rychlak | G01C 21/3469 701/532 |
| 2018/0143029 A1* | 5/2018 | Nikulin | G01C 21/3415 |
| 2023/0015077 A1* | 1/2023 | Kim | G06Q 10/06315 |

* cited by examiner

*Primary Examiner* — Joan T Goodbody
*Assistant Examiner* — Godfrey Aleksander Maciorowski
(74) *Attorney, Agent, or Firm* — Patterson + Sheridan, LLP

(57) ABSTRACT

Systems and methods for vehicle route planning are disclosed. The system is configured to identify one or more charging stations based on one or more geographic locations selected for route planning. The system is also configured to analyze carbon emissions data for the one or more charging stations based on utility grid locations associated therewith. The system is further configured to determine a route associated with the one or more geographic locations and select at least one charging station on the route for charging of a vehicle based on analysis of the carbon emissions data associated with the one or more charging stations. The system is still further configured to provide the route and the at least one charging station to a user for navigation of the vehicle.

17 Claims, 7 Drawing Sheets

EMISSION-OPTIMIZED VEHICLE ROUTE AND CHARGING

INTRODUCTION

The present disclosure relates generally to the automotive and vehicle route planning fields. More particularly, the present disclosure relates to a carbon emission-optimized vehicle route and charging planning system and method.

Conventional vehicle route planning typically takes into account current location or trip origin, trip destination, trip mileage, among other information. For example, when a user at a current location enters a desired trip destination into his or her infotainment or navigation system or mobile device, the vehicle route planning system may display several available route deviations from which the user may select. These deviation options may be configurable by the user, based on distance, type of road, and/or other considerations.

The present introduction is provided as illustrative environmental context only and should not be construed as being limiting in any manner. It will be readily apparent to those of ordinary skill in the art that the concepts and principles of the present disclosure may be applied in other environmental contexts equally.

SUMMARY

The present disclosure provides a carbon emission optimized charging vehicle route planning system and method that refines conventional vehicle route planning by considering and accounting for carbon emissions in the presentment and selection of available routes and charger locations. Trip routes and charging recommendations are optimized for minimizing carbon emissions associated with charging, based on a location of the charging station(s), and in particular a utility grid for each location, time of day, emissions forecasts for the particular utility grid(s), battery SOC, and the like.

In one illustrative embodiment, the present disclosure provides a vehicle route planning system. The system includes one or more processors and a memory storing computer-executable instructions that, when executed, cause the one or more processors to: identify one or more charging stations based on one or more geographic locations selected for route planning; analyze carbon emissions data for the one or more charging stations based on utility grid locations associated therewith; determine a route associated with the one or more geographic locations and select at least one charging station on the route for charging of a vehicle based on analysis of the carbon emissions data associated with the one or more charging stations; and provide the route and the at least one charging station to a user for navigation of the vehicle.

In another illustrative embodiment, the present disclosure provides a method. The method includes analyzing carbon emissions in one or more utility grid locations associated with one or more charging stations. The method further includes identifying at least one charging station from the one or more charging stations based at least on the carbon emissions analyzed. The method further includes determining a route based on the at least one charging station identified. The method also includes providing the route and the at least one charging station for display on a vehicle.

In a further illustrative embodiment, the present disclosure provides a method for vehicle route planning. The method includes determining a route between points of interest that optimizes carbon emissions associated with charging a vehicle traveling on the route by analyzing carbon emissions data for utility grid locations associated with charging stations on the route to identify which charging station minimizes the carbon emissions. The method also includes providing the route and the identified charging station to a user for navigation of the vehicle thereon.

In yet a further illustrative embodiment, the present disclosure provides a non-transitory computer-readable storage medium having computer-readable code stored thereon for programming one or more processors to perform steps. The steps include analyzing carbon emissions data for one or more charging stations based on utility grid locations associated therewith. The steps also include identifying at least one charging station for charging a vehicle based on analysis of the carbon emissions data for the one or more charging stations. The steps further include determining a route associated with the one or more geographic locations and that includes the at least one charging station thereon. The steps yet further include providing the route and the at least one charging station to a user for navigation of the vehicle.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, in various embodiments, the present disclosure relates to a carbon emission optimized charging vehicle route planning system and methods that refine conventional vehicle route planning by considering and accounting for carbon emissions in the presentment and selection of available routes and locations of charging stations. In particular, charging stations (such as fast charging locations) are each mapped to associated utility grid locations and the emissions data (such as real-time emissions data, historical emissions data, and projected emissions data) for those grid locations are used to determine/forecast carbon emissions for each of the charging stations at the time the vehicle is projected to pass through and utilize the respective charging stations. As will be discussed in further detail below, this information is presented to a user (such as a vehicle operator), such as with determined routes for a trip between at least two points of interest, which of those routes would minimize carbon emissions, and which charging station would minimize the carbon emissions along each route to allow the user to select which route to follow and select which charging station to utilize.

Figure 1:
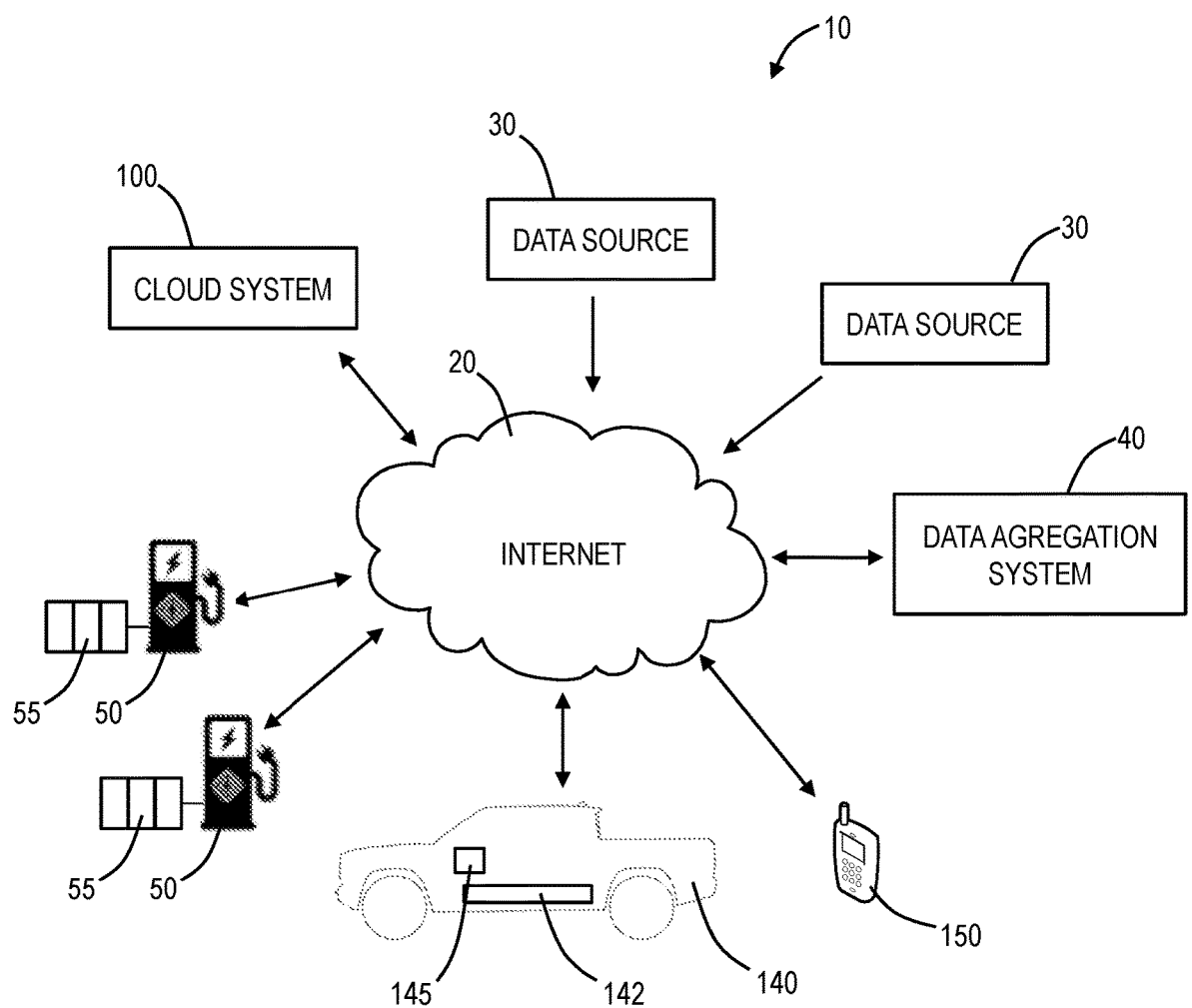
FIG. 1 is a schematic illustration of one illustrative embodiment of a carbon emission optimized charging vehicle route planning system of the present disclosure.

FIG. 1 is a schematic illustration of one illustrative embodiment of a carbon emission optimized charging vehicle route planning system 10 of the present disclosure. In various embodiments, the vehicle route planning system 10 includes at least a vehicle 140 and one or more data sources 30. The data sources 30 carbon emissions data for the associated utility grid locations of charging stations 50. The charging stations 50 are adapted for charging a battery 142, such as an arrangement of battery cells, of the vehicle 140. In some embodiments, the charging stations 50 are equipped with one or more renewable energy sources 55, such as solar panels, that are adapted to provide power for charging the vehicle 140.

In embodiments, one of a cloud system 100, a user device, or a combination thereof utilizes the carbon emissions data to determine carbon emissions for each of the charging stations at a time that the vehicle 140 is projected to pass through and utilize the charging stations 50 and is/are configured to optimize a vehicle route between at least two points of interest while minimizing the carbon emissions to produce the power consumed to charge the vehicle 140 while traveling on that vehicle route. In some embodiments, determining the carbon emissions for each of the charging stations 50 is further based on the one or more renewable energy sources 55 at the charging station 50, such as, which percentage of the power provided by the one or more renewable energy sources 55 for charging vehicles 140. In embodiments, the user device is one of a controller 145 of the vehicle 140 and a mobile device 150. In some embodiments, the controller 145 is or part of any control system, infotainment system, and the like of the vehicle 140; and the mobile device 150 is or part of a cellular phone, a tablet, a laptop, and the like. In various embodiments, the cloud system 100, the user device, or the combination thereof utilizes data including the carbon emissions data associated with each charging station 50, an SOC of the vehicle, projected power consumption/range of the vehicle 140, and the like, to optimize carbon emissions for charging the vehicle 140 by providing both a route and a charging station 50 that will minimize the carbon emissions produced for the power consumed by the vehicle 140.

In some embodiments, a data aggregation system 40 is utilized. The data aggregation system 40 is configured to obtain the carbon emissions data associated with the utility grid locations and provide carbon emissions data including one or more of real-time carbon emissions data, historical carbon emissions data, and carbon forecasted emissions data. In these embodiments, the cloud system 100 or the user device obtains the carbon emissions data from the data aggregation system 40. In other embodiments, the cloud system 100 is configured to obtain the carbon emissions data associated with the utility grid locations from the data sources 30 and determine emissions data for each charging station 50 including one or more of real-time emissions data, historical emissions data, and forecasted emissions data for each charging station 50. In embodiments, the emissions data is any of an amount of carbon emitted, a scaled score, such as a scale from clean emissions to dirty emissions, and the like. In some embodiments, the data sources 30 are the utility grid locations. In some embodiments, the cloud system 100 is also configured to obtain data for the one or more renewable energy sources 55 from each charging station 50, such as power produced thereby, a percentage of power provided thereby to the charging station 50, and the like. In some of these embodiments, the cloud system 100 is configured to combine the carbon emissions data for the utility grid locations with the renewable energy sources data to determine the emissions data for each charging station 50.

Figure 2:
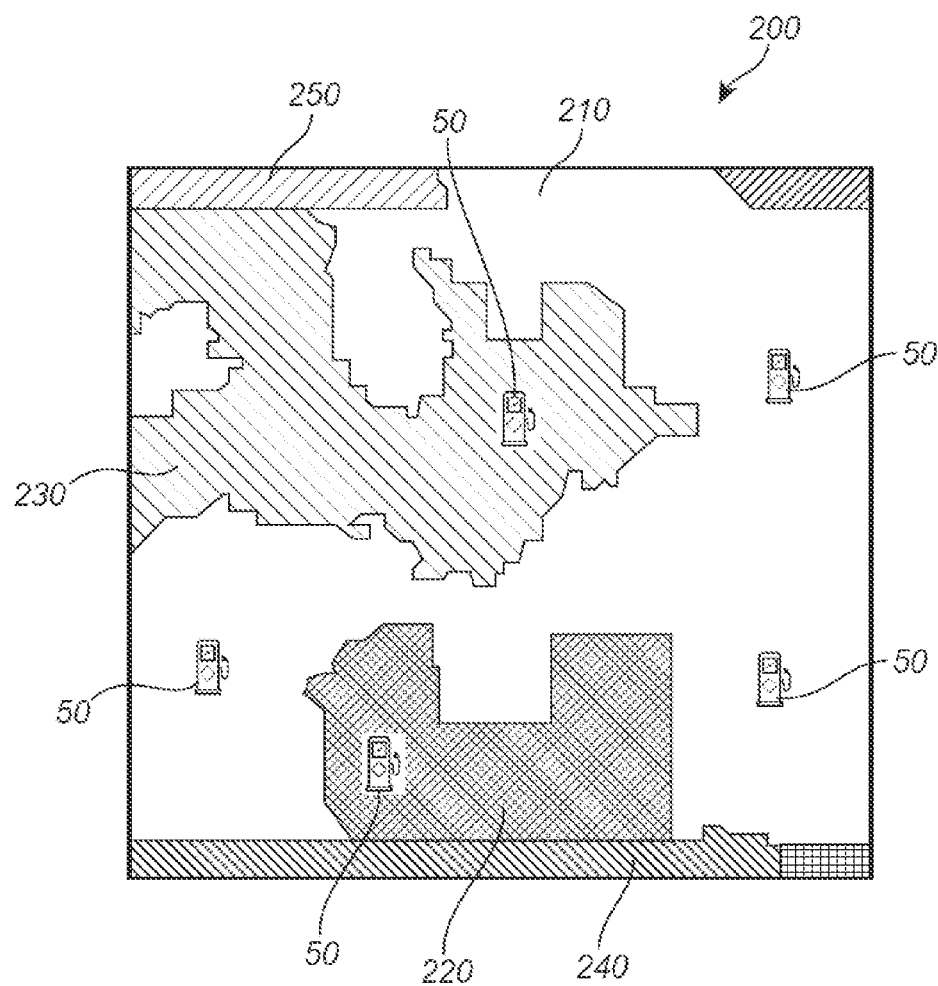
FIG. 2 is a map illustrating a snapshot of exemplary regional emissions intensity.

In some embodiments, the cloud system 100 is configured to map each charging station 50 with a utility grid location to identify which utility grid location provides power thereto. In other embodiments, the data aggregation system 40 performs this function. FIG. 2 is a map 200 illustrating a snapshot of exemplary regional emissions intensity. Referring to FIG. 2, regional utility grid location 210, 220, 230, 240, 250 has an emissions intensity based on how the power in the region is produced. In the map 200 illustrated in FIG. 2 the emissions intensity is highest in regional utility grid location 210, followed by regional utility locations 220 and 230. As such, charging the vehicle 140 at one of the charging stations 50 within regional utility grid location 210 will most likely result in a higher net effect in emissions as compared to charging the vehicle 140 at one of the charging stations 50 located in regional utility grid locations 220 and 230. In some embodiments, other factors, such as trip deviations to reach each charging station 50 and projected power consumption of the vehicle for traveling on those trip deviations, and the like, are also considered in determining the net effect charging the vehicle 140 will have at each location. For example, different distances traveled, different elevation changes made, and the like, can affect the power consumed by the vehicle 140 while traveling to/from a charging station 50.

Figure 3:
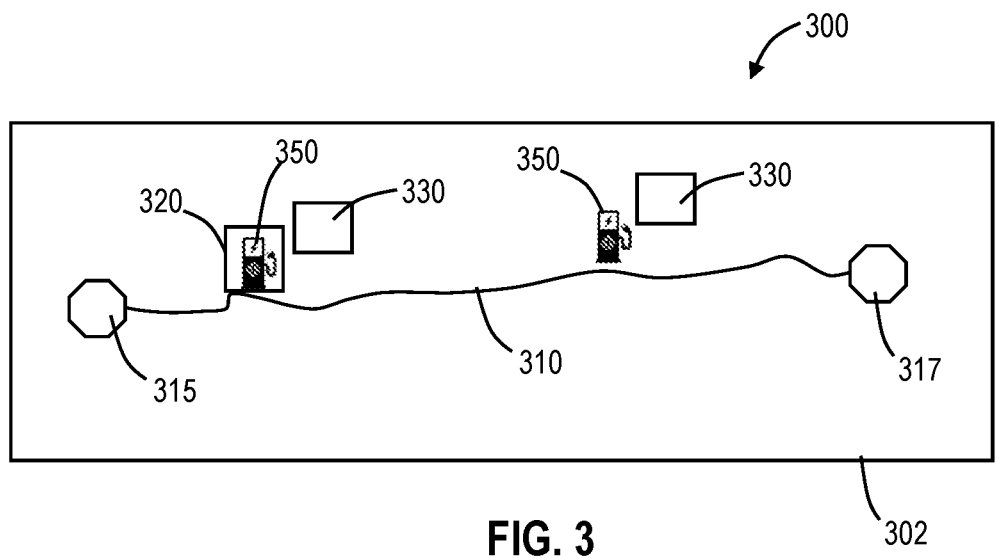
FIG. 3 is a schematic illustration of one illustrative embodiment of a User Interface (UI) highlighting a route map for carbon optimization of the present disclosure.

FIG. 3 is a schematic illustration of one illustrative embodiment of a User Interface (UI) 300 highlighting a route map 302 for carbon optimization of the present disclosure. The UI 300 is presented to a user on a display of the user device, such as on a display of the controller 145 in the vehicle 140 or a display of the mobile device 150. In some embodiments, information for the UI can be shared between the controller 145 and the mobile device 150, such as being pushed from one to the other.

The UI 300 is configured to display the route map 302 illustrating a route 310 between at least two points of interest including a starting point illustrated by a starting point icon 315, destination illustrated by a destination icon 317, and one or more charging stations along the route 310 illustrated by a charging station icon 350. In embodiments, the UI 300 is configured to identify the charging station 350 that optimizes carbon emissions, such as by minimizing an amount of carbon emissions discharged to produce the power used during travel of the vehicle 140 along the route 310. In various embodiments, this identification is performed by distinguishing the charging station 350 with some type of demarcation 320 in the UI 300 or by removing other charging stations 350 from the route map 302, and the like. In embodiments, the demarcation 320 is any of displaying the charging station icon 350 in a different color, a symbol being positioned on or adjacent to the charging station icon 350, a border placed around the charging station icon 350, and the like.

In some embodiments, the UI 300 is configured to display charging station information 330 for each charging station, such as adjacent to the associated charging station icon 350. In some of these embodiments, the charging station information 330 includes emissions data, such as any of current emissions data, historical emissions data, and projected emissions data for a time that the vehicle 140 traveling on the route 310 is projected to arrive thereat. Other information, such as charging station availability, wait times, and the like, can also be displayed. In some embodiments, the charging station information 330 is always displayed. In other embodiments, the charging station information 330 is displayed upon selection of the respective charging station icon 350 or by activation of an option for the display thereof.

Figure 4:
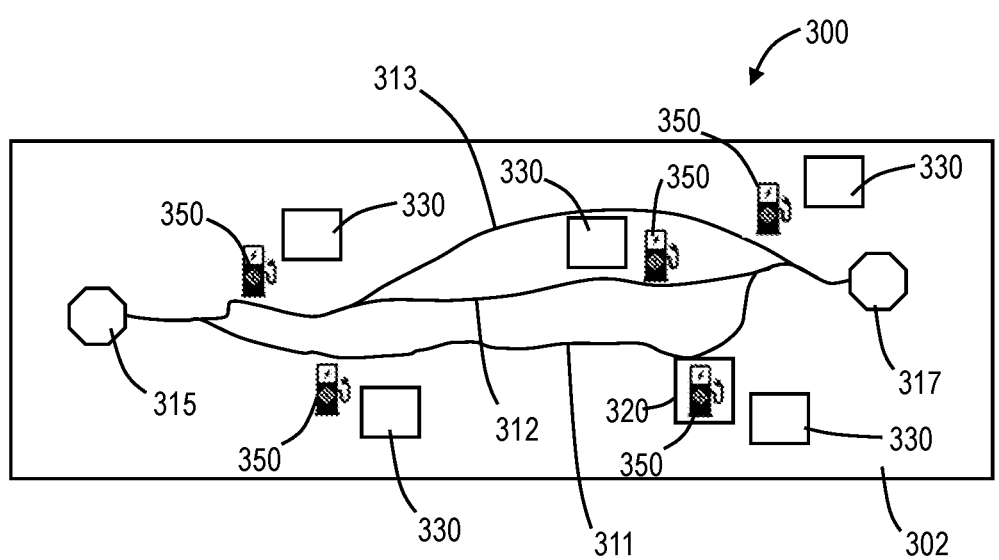
FIG. 4 is a schematic illustration of one illustrative embodiment of the UI highlighting a route map with thresholded deviations of routes including a route for carbon optimization of the present disclosure.

FIG. 4 is a schematic illustration of one illustrative embodiment of the UI 300 highlighting a route map 302 with thresholded deviations of routes 311, 312, 313 including a route 311 for carbon emission optimization of the present disclosure. In embodiments, one of the cloud system 100, the user device (such as the controller 145 of the vehicle 140 or a mobile device 150), or a combination thereof determines multiple deviations for traveling between the starting point and the destination. Once determined, the UI 300 is configured to display the routes 311, 312, 313 of those deviations therein. In embodiments, each of these deviations is thresholded to provide travel options to the user. For example, in the embodiment illustrated in FIG. 4, the route 311 is thresholded to minimize carbon emissions, the route 312 is thresholded to minimize travel distance, and the route 313 is thresholded to minimize travel time. In some embodiments, other deviations are also presented in the UI 300, such as routes that include one or more other points of interest, routes that consider projected wait times at the charging stations, or routes that include a hybrid of thresholds, such as travel time, charging time/wait time, distance, and carbon optimization.

In embodiments, upon receipt of a selection of one of the routes 311, 312, 313, the UI 300 is configured to display only the route selected, such as the route 310 illustrated in FIG. 3. In some of these embodiments, the UI 300 is configured to identify the charging station that will optimize carbon emissions by displaying the respective charging station icon 350 with the demarcation 320. In some embodiments, the UI 300 is configured to receive a selection of a charging station icon 350 to identify which charging station the user intends to use to charge the vehicle 140. In some of these embodiments, upon receipt of the selection, the vehicle route planning system 10, such as via any combination of the user device, the cloud system 100, and the charging station 50 reserve a charger at the charging station 50 for the vehicle 140 at a projected arrival time, such as an arrival window.

In some embodiments, the routes 311, 312, 313 are optimized with multiple points of interest over a multi-day trip. In these embodiments, the charging for the vehicle is optimized over the multiple days rather than the individual days.

In some embodiments, the charging is re-optimized during a trip to account for any changes in conditions in carbon emissions at any of the charging stations 50, changes in the SOC of the battery 142 of the vehicle 140, and the like. The re-optimization can be performed in real time, in intervals, and the like.

Figure 5:
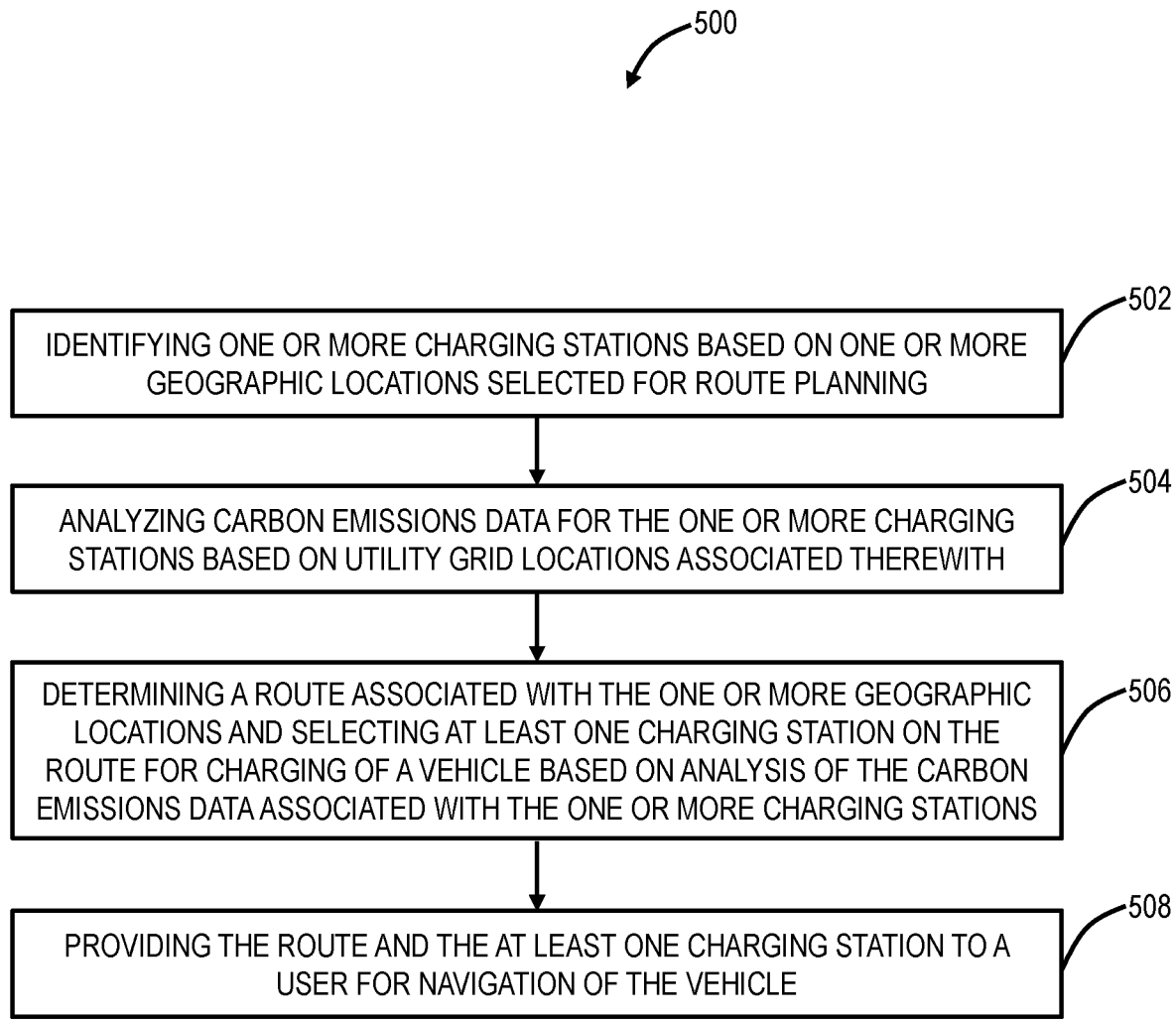
FIG. 5 is a flowchart of one illustrative embodiment of a method for vehicle route planning to optimize carbon emissions by utility grids providing power for charging of an electric vehicle of the present disclosure.

FIG. 5 is a flowchart of one illustrative embodiment of a method 500 for vehicle route planning to optimize carbon emissions by utility grids providing power for charging of an electric vehicle of the present disclosure. The method includes determining a route between points of interest that optimizes carbon emissions associated with charging a vehicle traveling on the route by analyzing carbon emissions data for utility grid locations associated with charging stations on the route to identify which charging station minimizes the carbon emissions at step 502. The method also includes providing the route and the identified charging station to a user for navigation of the vehicle thereon at step 504.

In embodiments of the method, providing the route and the identified charging station to the user includes presenting a route map to the user on a user interface that illustrates the route and demarks a charging station icon to identify the charging station that optimizes carbon emissions thereon. In embodiments of the method, the carbon emissions data includes at least one of real-time carbon emissions data, historical carbon emissions data, and projected carbon emissions data.

In embodiments of the method, identifying which charging station on the route minimizes the carbon emissions data is based on projecting the carbon emissions associated with the charging stations at a projected arrival time of the vehicle at each of the charging stations.

In some embodiments, the SOC of the battery of the vehicle is used to determine which charging stations are within range of the vehicle and only those charging stations are considered for the route, at least for the first charge of the vehicle traveling on a route that will require multiple charges to complete. In some embodiments where multiple charges are required to travel between two points of interest, the method includes determining how much to charge the battery at each location in order to minimize the carbon emissions associated with the charging of the battery, while ensuring sufficient charge is available to travel to the next charging station. For example, if a trip requires stopping at a first charging station and a second charging station and the first charging station has a higher emissions score than the second charging station, carbon emissions are optimized by limiting the charging of the battery to an amount needed for the vehicle to reach the second charging station and then performing a full charge of the battery at the second charging station. In some embodiments where multiple charges are required for the route, the method includes identifying a first charging station within range a range of the vehicle, based on a SOC of the battery, that optimizes the carbon emissions, identifying a second charging station that is within the range of the vehicle from the first charging station and optimizes carbon emissions, comparing the carbon emissions produced by the first charging station and the second charging station, and in response to the second charging station being associated with less carbon emissions than the first charging station, determining how much to charge the battery of the vehicle at the first charging station in order to reach the second charging station and recommending to the user how much to charge the battery at the first charging station.

In embodiments, the method further includes determining other routes between the points of interest based on other thresholds including routes that minimize travel time and travel distance. In some of these embodiments, the method yet further includes identifying which charging station on the routes that minimize travel time and travel distance minimizes the carbon emissions for charging the vehicle traveling on the routes that minimize travel time and travel distance.

In some embodiments, the method further includes mapping each of the charging stations to respective utility grid locations and obtaining the carbon emissions data for the utility grid locations. In some embodiments, the method yet further includes obtaining renewable energy data from each charging station that includes renewable energy sources and determining emissions data for each charging station utilizing the carbon emissions data and the renewable energy data.

In embodiments, the method, and any of the embodiments outlined above, is performed by a vehicle route planning system including a system chosen from one of the cloud system 100, a user device, and a combination of the cloud system 100 and the user device. In some of these embodiments, the user device is one of the controller 145 of the vehicle 140 and the mobile device 150.

Figure 6:
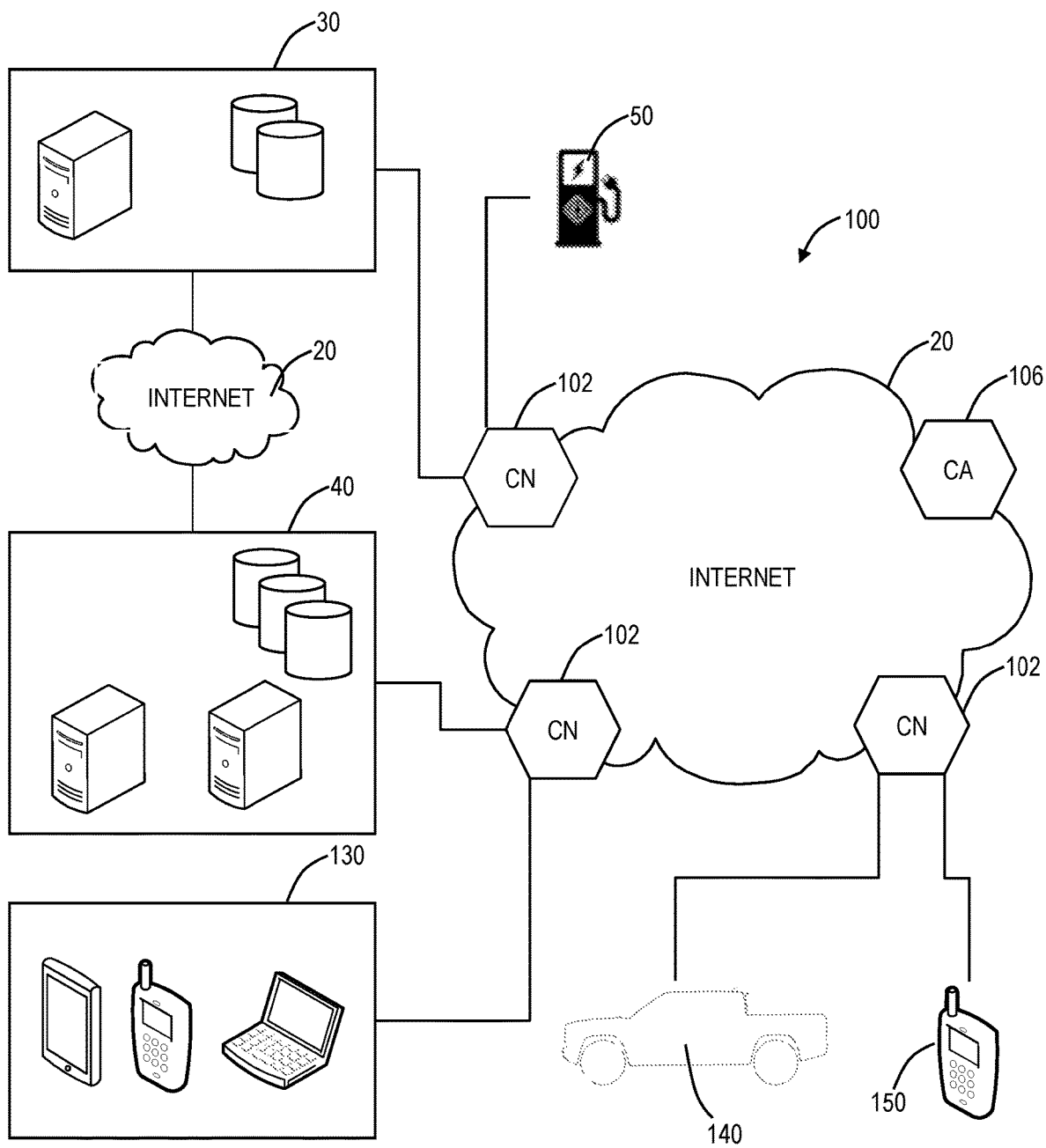
FIG. 6 is a network diagram of a cloud-based system for implementing the various systems and methods of the present disclosure.
Figure 7:
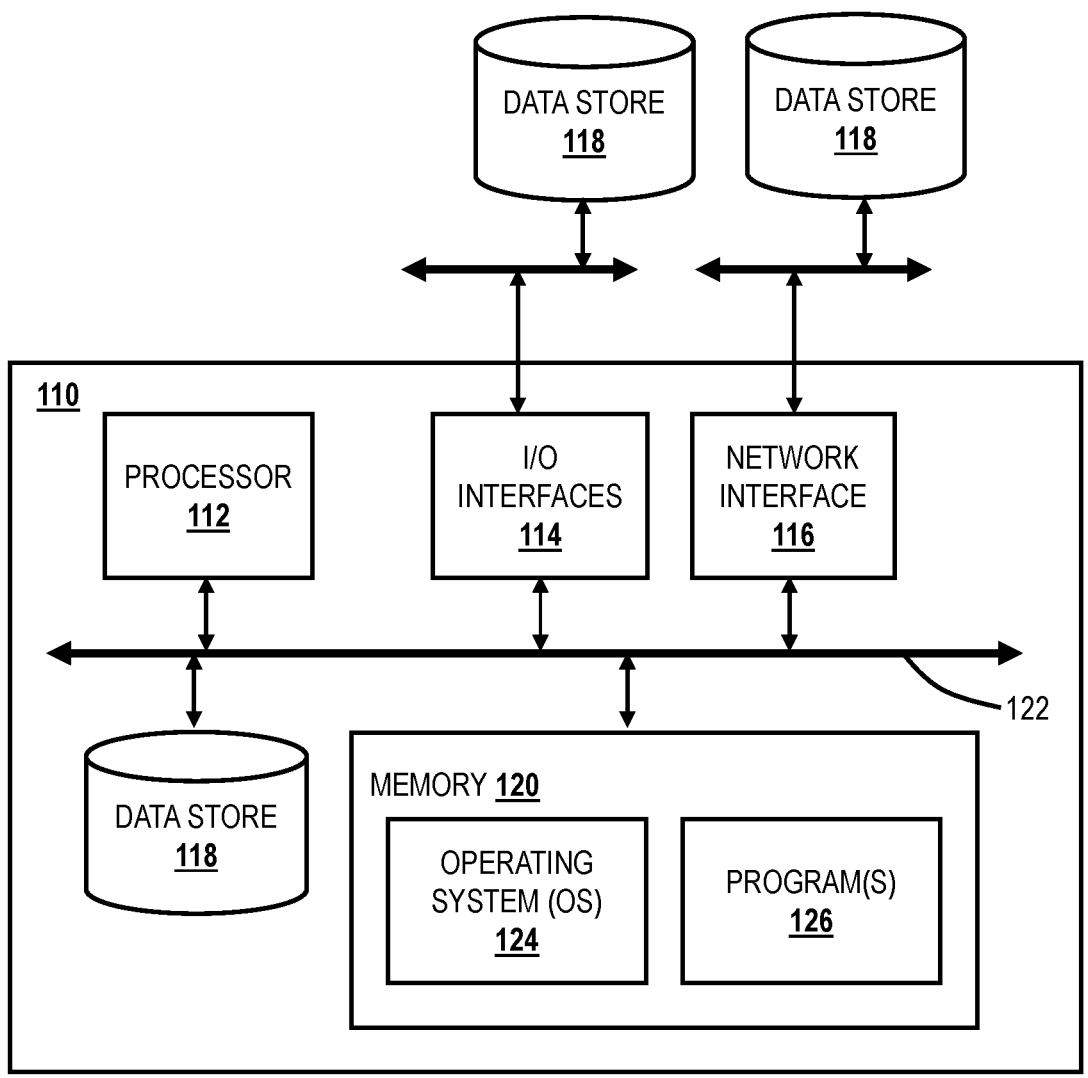
FIG. 7 is a block diagram of a server/processing system that may be used in the cloud-based system of FIG. 6 or stand-alone.

FIG. 6 is a network diagram of the cloud system 100 for implementing various cloud-based services of the present disclosure, where applicable. The cloud system 100 includes one or more cloud nodes (CNs) 102 communicatively coupled to the Internet 104 or the like. In embodiments, the cloud nodes 102 are implemented as a server or other processing system 110 (as illustrated in FIG. 7) or the like and are geographically diverse from one another, such as located at various data centers around the country or globe. Further, in some embodiments, the cloud system 100 includes one or more central authority (CA) nodes 106, which similarly are implemented as the server 110 and are connected to the CNs 102. For illustration purposes, the cloud system 100 connects to data sources 30, a data aggregation system 40, charging stations 50, various individual's homes 130, vehicles 140, and mobile devices 150, each of which communicatively couples to one of the CNs 102. These locations 30, 40, and 130, and devices 140 and 150 are shown for illustrative purposes, and those skilled in the art will recognize there are various access scenarios to the cloud system 100, all of which are contemplated herein. The cloud system 100 can be a private cloud, a public cloud, a combination of a private cloud and a public cloud (hybrid cloud), or the like.

Again, the cloud system 100 provides any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the charging stations 50, the devices an individual's home 130, the vehicles 140, and the mobile devices 150.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 7 is a block diagram of a server or other processing system 110, which may be used in the cloud-based system 100 (FIG. 6), in other systems, or stand-alone, such as in the vehicle itself. For example, the CNs 102 (FIG. 6) and the central authority nodes 106 (FIG. 6) may be formed as one or more of the servers 110. In embodiments, the server 110 is a digital computer that, in terms of hardware architecture, generally includes a processor 112, input/output (I/O) interfaces 114, a network interface 116, a data store 118, and memory 120. It should be appreciated by those of ordinary skill in the art that FIG. 7 depicts the server or other processing system 110 in an oversimplified manner, and a practical embodiment may include additional components and suitably configured processing logic to support known or conventional operating features that are not described in detail herein. The components (112, 114, 116, 118, and 120) are communicatively coupled via a local interface 122. The local interface 122 may be, for example, but is not limited to, one or more buses or other wired or wireless connections, as is known in the art. The local interface 122 may have additional elements, which are omitted for simplicity, such as controllers, buffers (caches), drivers, repeaters, and receivers, among many others, to enable communications. Further, the local interface 122 may include address, control, and/or data connections to enable appropriate communications among the aforementioned components.

The processor 112 is a hardware device for executing software instructions. The processor 112 may be any custom made or commercially available processor, a central processing unit (CPU), an auxiliary processor among several processors associated with the server 110, a semiconductor-based microprocessor (in the form of a microchip or chipset), or generally any device for executing software instructions. When the server 110 is in operation, the processor 112 is configured to execute software stored within the memory 120, to communicate data to and from the memory 120, and to generally control operations of the server 110 pursuant to the software instructions. The I/O interfaces 114 may be used to receive user input from and/or for providing system output to one or more devices or components.

The network interface 116 may be used to enable the server 110 to communicate on a network, such as the Internet 114 (FIG. 6). The network interface 116 may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface 116 may include address, control, and/or data connections to enable appropriate communications on the network. A data store 118 may be used to store data. The data store 118 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 118 may incorporate electronic, magnetic, optical, and/or other types of storage media. In one example, the data store 118 may be located internal to the server 110, such as, for example, an internal hard drive connected to the local interface 122 in the server 110. Additionally, in another embodiment, the data store 118 may be located external to the server 110 such as, for example, an external hard drive connected to the I/O interfaces 114 (e.g., a SCSI or USB connection). In a further embodiment, the data store 118 may be connected to the server 110 through a network, such as, for example, a network-attached file server.

In embodiments, the memory 120 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 120 may incorporate electronic, magnetic, optical, and/or other types of storage media. Note that the memory 120 may have a distributed architecture, where various components are situated remotely from one another but can be accessed by the processor 112. The software in memory 120 may include one or more software programs, each of which includes an ordered listing of executable instructions for implementing logical functions. The software in the memory 120 includes a suitable operating system (O/S) 124 and one or more programs 126. The operating system 124 essentially controls the execution of other computer programs, such as the one or more programs 126, and provides scheduling, input-output control, file and data management, memory management, and communication control and related services. The one or more programs 126 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
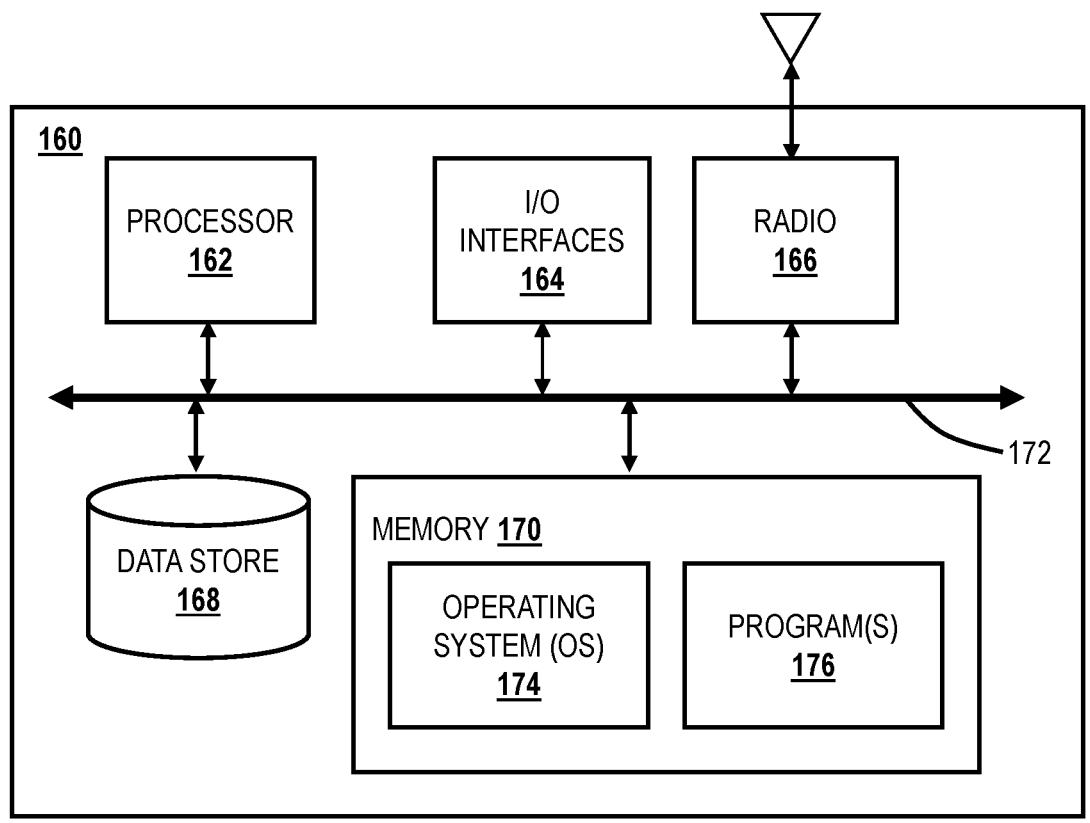
FIG. 8 is a block diagram of a remote device that may be used in the cloud-based system of FIG. 6 or stand-alone.

FIG. 8 is a block diagram of a user device 160, which may be used in the cloud system 100 (FIG. 6), as part of a network, or stand-alone. In embodiments, the user device 160 is one of a controller 145 in a vehicle or a mobile device 150, such as a smartphone, a tablet, a smartwatch, a laptop, etc. The user device 160 can be a digital device that, in terms of hardware architecture, generally includes a processor 162, I/O interfaces 164, a radio 166, a data store 168, and memory 170. It should be appreciated by those of ordinary skill in the art that FIG. 8 depicts the user device 160 in an oversimplified manner, and a practical embodiment may include additional components and suitably configured processing logic to support known or conventional operating features that are not described in detail herein. The components (162, 164, 166, 168, and 170) are communicatively coupled via a local interface 172. The local interface 172 can be, for example, but is not limited to, one or more buses or other wired or wireless connections, as is known in the art. The local interface 172 can have additional elements, which are omitted for simplicity, such as controllers, buffers (caches), drivers, repeaters, and receivers, among many others, to enable communications. Further, the local interface 172 may include address, control, and/or data connections to enable appropriate communications among the aforementioned components.

The processor 162 is a hardware device for executing software instructions. In embodiments, the processor 162 is any custom made or commercially available processor, a CPU, an auxiliary processor among several processors associated with the user device 160, a semiconductor-based microprocessor (in the form of a microchip or chipset), or generally any device for executing software instructions. When the user device 160 is in operation, the processor 162 is configured to execute software stored within the memory 170, to communicate data to and from the memory 170, and to generally control operations of the user device 160 pursuant to the software instructions. In an embodiment, the processor 162 may include a mobile optimized processor such as optimized for power consumption and mobile applications. In embodiments, the I/O interfaces 164 are used to receive user input from and/or for providing system output and includes a touch screen display. User input can be provided via, for example, a user interface on a touch screen display (such as UI 300), a keypad, a scroll ball, a scroll bar, buttons, and the like. System output can be provided via a display device such as a liquid crystal display (LCD), touch screen, and the like.

The radio 166 enables wireless communication to an external access device or network. Any number of suitable wireless data communication protocols, techniques, or methodologies can be supported by the radio 166, including any protocols for wireless communication. The data store 168 may be used to store data. The data store 168 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, in embodiments, the memory 170 includes any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 170 may incorporate electronic, magnetic, optical, and/or other types of storage media. Note that the memory 170 may have a distributed architecture, where various components are situated remotely from one another, but can be accessed by the processor 162. The software in memory 170 can include one or more software programs, each of which includes an ordered listing of executable instructions for implementing logical functions. In the example of FIG. 8, the software in the memory 170 includes a suitable operating system 174 and programs 176. The operating system 174 essentially controls the execution of other computer programs and provides scheduling, input-output control, file and data management, memory management, and communication control and related services. The programs 176 may include various applications, add-ons, etc. configured to provide end user functionality with the user device 160. For example, example programs 176 may include, but not limited to, a web browser, social networking applications, streaming media applications, games, mapping and location applications, electronic mail applications, financial applications, and the like. In a typical example, the end-user typically uses one or more of the programs 176 along with a network, such as the cloud system 100 (FIG. 6).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A vehicle route planning system comprising:
   a display comprising a user interface;
   a data aggregation system aggregating carbon emissions data; and
   a system comprising one or more processors and a memory storing computer-executable instructions that, when executed, cause the one or more processors to:
   identify a plurality of charging stations based on one or more geographic locations selected for route planning;
   receive the carbon emissions data from the data aggregation system and analyze the carbon emissions data for the plurality of charging stations based on utility grid locations associated therewith;
   determine a route to the one or more geographic locations by selecting a set of vehicle charging stations that minimizes vehicle charging station carbon emissions, the set of vehicle charging stations being included in the plurality of charging stations;
   display the route and the set of charging stations to a user on the display and simultaneously display another route associated with the one or more geographic locations that is thresholded based on another factor to the user on the display;
   receive a selection from the user of the route that minimizes vehicle charging station carbon emissions via the user interface; and
   responsive to the selection from the user, display only the route and the set of charging stations to the user on the display for navigation of the vehicle.

2. The route planning system of claim 1, wherein the system is chosen from one of a cloud system, a user device, and a combination of the cloud system and the user device, and wherein the user device is chosen from one of a controller of the vehicle and a mobile device.

3. The route planning system of claim 1, wherein displaying the route and the set of charging stations to the user includes presenting a route map on the user interface that illustrates the route and demarks charging station icons to identify the set of charging stations.

4. The route planning system of claim 1, wherein the carbon emissions data includes at least one type of data chosen from real-time carbon emissions data, historical carbon emissions data, and projected carbon emissions data.

5. The route planning system of claim 1, wherein the instructions, when executed, cause the one or more processors to:
   determine the another route associated with the one or more geographic locations based on a thresholds selected from travel time and travel distance; and
   determine a charging station on the another route that minimizes travel time or travel distance based on the analysis of the carbon emissions data associated with the plurality of charging stations.

6. The route planning system of claim 1, wherein the instructions, when executed, cause the one or more processors to:
   obtain renewable energy data from the plurality of charging stations that include renewable energy sources, wherein analyzing the carbon emissions data for the plurality of charging stations is further based on the renewable energy data.

7. A method for vehicle route planning comprising:
   identifying a plurality of charging stations based on one or more geographic locations selected for route planning;
   receiving carbon emissions data from a data aggregation system and analyzing the carbon emissions data for the plurality of charging stations based on utility grid locations associated therewith;
   determining a route to the one or more geographic locations by selecting a set of vehicle charging stations that minimizes vehicle charging station carbon emissions, the set of vehicle charging stations being included in the plurality of charging stations;
   displaying the route and the set of charging stations to a user on a display and simultaneously displaying another route associated with the one or more geographic locations that is thresholded based on another factor to the user on the display;
   receiving a selection from the user of the route that minimizes vehicle charging station carbon emissions via a user interface of the display; and
   responsive to the selection from the user, displaying only the route and the set of charging stations to the user on the display for navigation of the vehicle.

8. The method of claim 7, wherein displaying the route and the set of charging stations to the user includes presenting a route map on the user interface that illustrates the route and demarks charging station icons to identify the set of charging stations.

9. The method of claim 7, wherein the carbon emissions data includes at least one type of data chosen from real-time carbon emissions data, historical carbon emissions data, and projected carbon emissions data.

10. The method of claim 7, further comprising:
    determining the another route associated with the one or more geographic locations based on a thresholds selected from travel time and travel distance; and
    determining a charging station on the another route that minimizes travel time or travel distance based on the analysis of the carbon emissions data associated with the plurality of charging stations.

11. The method of claim 7, further comprising mapping each of the plurality of charging stations to respective utility grid locations and obtaining the carbon emissions data for the respective utility grid locations.

12. The method of claim 7, further comprising obtaining renewable energy data from the plurality of charging stations that include renewable energy sources, wherein analyzing the carbon emissions data for the plurality of charging stations is further based on the renewable energy data.

13. A non-transitory computer-readable storage medium having computer-readable code stored thereon for programming one or more processors to perform steps of:
identifying a plurality of charging stations based on one or more geographic locations selected for route planning;
receiving carbon emissions data from a data aggregation system and analyzing the carbon emissions data for the plurality of charging stations based on utility grid locations associated therewith;
determining a route to the one or more geographic locations by selecting a set of vehicle charging stations that minimizes vehicle charging station carbon emissions, the set of vehicle charging stations being included in the plurality of charging stations;
displaying the route and the set of charging stations to a user on a display and simultaneously displaying another route associated with the one or more geographic locations that is thresholded based on another factor to the user on the display;
receiving a selection from the user of the route that minimizes vehicle charging station carbon emissions via a user interface of the display; and
responsive to the selection from the user, displaying only the route and the set of charging stations to the user on the display for navigation of the vehicle.

14. The non-transitory computer-readable storage medium of claim 13, wherein displaying the route and the set of charging stations to the user includes presenting a route map on the user interface that illustrates the route and demarks charging station icons to identify the set of charging stations.

15. The non-transitory computer-readable storage medium of claim 13, wherein the carbon emissions data includes at least one type of data chosen from real-time carbon emissions data, historical carbon emissions data, and projected carbon emissions data.

16. The non-transitory computer-readable storage medium of claim 13, wherein the steps further include:
determining the another route associated with the one or more geographic locations based on a thresholds selected from travel time and travel distance; and
determining a charging station on the another route that minimizes travel time or travel distance based on the analysis of the carbon emissions data associated with the plurality of charging stations.

17. The non-transitory computer-readable storage medium of claim 13, wherein the steps include obtaining renewable energy data from the plurality of charging stations that include renewable energy sources, wherein analyzing the carbon emissions data for the plurality of charging stations is further based on the renewable energy data.

* * * * *